Patented Mar. 26, 1946

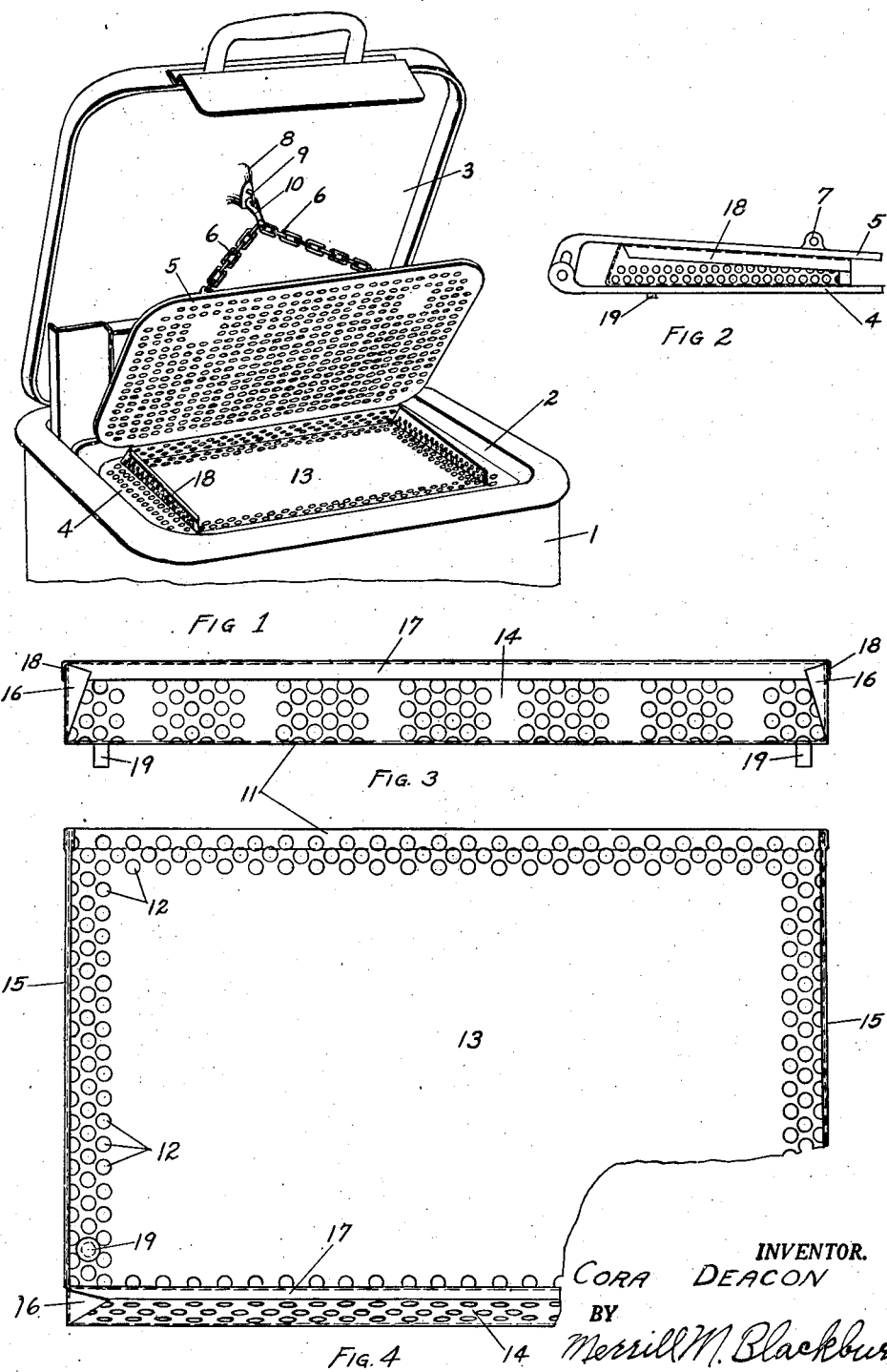

2,397,410

UNITED STATES PATENT OFFICE 2,397,410

CULINARY EQUIPMENT

Cora Deacon, Davenport, Iowa, assignor to Deacon Products, Inc., Moline, Ill., a corporation of Illinois Application July 31, 1943, Serial No. 497,141

7 Claims. (Cl. 99—340)

The present invention relates to the culinary art and more particularly to that part of the art represented by the Fred B. Fink Patent No. 2,191,275. Specifically, it relates to a tray for use between the heated plates of such an apparatus, this tray adapting this apparatus for use in the cooking of such articles as eggs. Obviously, it can be used for the cooking of various other foods, such as oysters, French fried potatoes, sliced mush, sliced bread, sliced sweet potato, etc. However, its use will be described in connection with the cooking of eggs, since this is believed to be its primary use, commercially.

Among the objects of this invention are the provision of an apparatus for use in a cooker of the type disclosed in the above mentioned Fink patent for the supporting of articles of food which are either more or less fluid or coated with some substance having a tendency to run or drop through the perforations in the lower plate of the cooking apparatus; the provision of a supporting plate for supporting articles to be cooked in a cooker of the type referred to, which support will also support the upper plate out of contact with the food being cooked; and such further objects, advantages, and capabilities as will hereafter appear and as are inherent in the construction disclosed herein. My invention further resides in the combination, construction, and arrangement of parts illustrated in the accompanying drawing and, while I have shown therein what is now regarded as the preferred embodiment of this invention, I desire the same to be understood as illustrative only and not to be interpreted in a limiting sense.

In the drawing annexed hereto and forming a part hereof,

Figure 1 represents a fragmentary perspective of a machine of the type disclosed in the above mentioned Fink patent and also in Erickson Patent No. 2,244,145 and Miller Patent No. 2,244,168, the tray of my invention being shown as applied between the heating plates of such a cooker before these plates are lowered into the cooking pot by the lowering of the lid;

Figure 2 is an end view of the tray of my invention, the same being illustrated as held between an upper and a lower plate;

Figure 3 represents a back edge view of this tray; and

Figure 4 represents a plan view, partly broken away, of the tray of my invention.

Reference will now be made in greater detail to the annexed drawing for a more complete description of this invention. In the annexed drawing, the casing of the cooker is denoted by the numeral 1, the cooking pot by the numeral 2, the lid by the numeral 3, the lower plate by the numeral 4, and the upper plate by the numeral 5. The upper plate 5 is connected to the lid 3 by a pair of flexible members 6 which are connected to ears 7 on the top of the upper plate. The plates 4 and 5, as shown in Figure 2, are pivotally connected and are also connected for relative separation. However, the illustration of this connecting means in Figure 2 is purely for the purpose of showing the capability of relative movement and is not illustrative of the actual structure of these parts at the point of connection, this structure being better illustrated in the Erickson and Miller patents, referred to above. The lid 3 is provided on its inner surface with a lug 8 which has a loop 9 projecting therefrom, to which the flexible members 6 are connected by a snap 10.

A tray 11 is provided around its periphery with a plurality of rows of perforations 12 which permit drainage from the plate of a fluid in which the tray is submerged in the cooking operation. This tray has a bottom plate 13, a back flange 14, and end flanges 15. These are preferably formed by bending the sheet material upwardly, turning the top edges downwardly to form stiffening ribs along the edges and overlapping the corners to make the structure rigid. Such overlapping is shown at 16. The stiffening along the top edges is shown at 17 and 18. Preferably, where the corners are overlapped at 16, the sheet metal is spot-welded so as to increase the rigidity of the structure. Lugs extending downwardly from the lower face of the plate 13 are provided, the same being preferably formed by driving rivets 19 through apertures in the plate 13.

As is clear from Figures 1, 2, and 4, the back flange of the plate 13 is inclined forwardly toward the forward edge of the plate to provide additional cooking space on the top of the plate, since the top edge of the flange cannot be farther back than a certain point, and yet the plate 13 can extend farther back than that. The flange is omitted from the front edge of the plate in order to make it easier to insert and remove articles of food from the plate, during use thereof.

Having raised the lid 3 and placed the tray 11 between the plates 4 and 5, as shown in Figure 1, one is ready to lower the lid so as to submerge the plates and tray into the hot oil in the cooker pot 2. Since the temperature of this oil, thermostatically controlled, is kept at somewhere between 375° and 400° F., it is necessary that a good grade be used. Our experience has shown that the best grade for use in this cooker appears to be Swift's XXX Vream. After the tray 11 has been submerged in this hot oil for a short time, its temperature is such that eggs to be cooked can be placed thereon without the whites running out of the perforations 12. As many as twelve eggs can be placed at one time in this tray and then all be submerged simultaneously, simply by lowering the lid 3. When this is done, the top plate 5 comes down on the top edges of the flanges 14 and 15, and then the plates and tray are submerged into the hot oil. After a few seconds, the lid can be raised and the eggs removed, all properly cooked. Attention is called to the fact that the oil surrounds the food being cooked so that it is cooked as well on the top as on the bottom. As the lid 3 is raised, the hot oil runs out through the perforations 12 and off from the front edge of the tray, and the excess oil is therefore drained away very quickly from the tray. After the food has been removed from the plate 13, it is desirable to again close the lid so as to reduce to a minimum the heat loss, due to having the lid open. Therefore, the tray, when in the cooker, is always kept at a temperature controlled by the thermostat and ready for instant use.

Instead of using the positioning lugs 19, a section of the back flange 14 can be severed along three sides and separated from the tray except along the edge where it is joined to the bottom of the tray, thus forming a tab. This can be any size desired but it seems preferable to have it about one-half or three-fourths of an inch on each side. A single perforation can be formed approximately centrally of this tab and left projecting from the back edge of the tray bottom, and a rivet, comparable to rivet 19, can be placed in this perforation. This will give a positioning lug to hold the tray in place and prevent it from slipping with relation to the plates 4 and 5.

Having now described my invention, I claim:

1. In a culinary machine having a cooking pot and a pair of hingedly connected apertured plates therein; a cooking tray having a substantially flat bottom provided with a downwardly extending lug or lugs to fit into an aperture or apertures of one of said plates, said tray being located between said plates and provided along part of its edges with an upstanding flange, said flange and the outer portion of the bottom of the tray being provided with apertures to permit drainage therefrom of a fluid when the tray is raised out of the fluid after being submerged therein.

2. In a culinary apparatus comprising a casing having a hinged lid, a heating pot mounted therein, and a pair of upper and lower apertured plates connected together for relative pivotal motion and for substantially vertical motion into and out of said pot; a tray for cooperative use with the plates, said tray having means projecting from its bottom for engagement with one of said plates to prevent sliding of the tray with relation to said one plate, said tray having along a plurality of its edges upstanding flanges to support the upper plate above the bottom of the tray.

3. A structure as defined by claim 2 in which the flanges are along the back and side edges only of the bottom and the front edge is unobstructed, the tops of the flanges supporting the top plate spaced from the bottom.

4. A culinary apparatus comprising, in combination, a supporting casing, a heatable cooking pot supported thereby, a lid for the casing pivotally connected thereto, a pair of upper and lower pivotally connected plates mounted to be raised out of or lowered into the pot by the raising and lowering of the lid, flexible means connecting the lid with the upper plate to cause pivoting thereof with relation to the lower plate when the lid is raised, and a cooking tray to be definitely positioned with relation to the lower plate, said lower plate having apertures therein and said tray having downwardly extending projections to enter some of the apertures in said lower plate whereby to hold the tray against sliding with relation to said lower plate, said tray having upstanding flanges along three of its edges to hold the upper plate spaced from the lower plate when the tray is positioned between the plates and the lid is closed.

5. The combination, in a culinary apparatus, of a pair of spaced hingedly connected apertured plates which, in use, are approximately parallel, and a cooking tray comprising a marginally apertured bottom with a lug or lugs extending downwardly therefrom to engage in the lower apertured plate whereby the tray may be held definitely positioned with reference to the said lower apertured plate with which used, said tray bottom having upstanding means to support the upper plate of the cooking apparatus in spaced relation with reference to said bottom.

6. In a culinary apparatus having an apertured submersible substantially horizontal plate, a cooking tray having an upstanding flange along at least two of its edges, said flanges being apertured to permit fluid to drain from the tray when it is removed from the cooking fluid in which it has been submerged, said tray and plate having readily connectible and disconnectible means for holding the tray against sliding with reference to the said plate, and a second plate pivotally connected to the first plate and arranged to be let down on top of the tray when the latter is immersed.

7. A cooking tray for use in a culinary apparatus utilizing hot oil as the source of cooking heat having a substantially horizontal apertured plate and a cover plate pivotally connected to the first plate; said tray comprising a substantially rectangular flat body part having the major portion of its flat surface imperforate, said tray being provided along part of its edges with upstanding flanges, apertured to permit drainage of the liquid therefrom whereby to retain on the imperforate part of the tray fluid food placed thereon to be cooked and prevent the same from escaping through the bottom of the tray, the front edge of the tray being unobstructed, and interconnecting means, fixedly connected to the plate or tray, constructed and arranged to connect said plate and tray to prevent relative sliding thereof during use, said tray being also devoid of any upstanding projection other than said flanges, which could prevent the cover plate from closing down on the flanges.

CORA DEACON.